United States Patent [19]

Gaeke

[11] 3,915,013
[45] Oct. 28, 1975

[54] LOW PRESSURE GAS SAMPLE APPARATUS AND METHOD

[75] Inventor: Gottlieb C. Gaeke, Baton Rouge, La.

[73] Assignee: Ethyl Corporation, Richmond, Va.

[22] Filed: Feb. 4, 1974

[21] Appl. No.: 439,005

[52] U.S. Cl. .......................................... 73/422 GC
[51] Int. Cl.² ........................................... G01N 1/22
[58] Field of Search .......... 73/422 GC, 23.1, 61.1 C

[56] References Cited
UNITED STATES PATENTS

| | | | |
|---|---|---|---|
| 3,032,953 | 5/1962 | Micheletti | 73/422 |
| 3,240,052 | 3/1966 | Reinecke | 73/23.1 |
| 3,426,600 | 2/1969 | Bochinski | 73/422 GC |
| 3,511,080 | 5/1970 | Roof | 73/422 GC |

Primary Examiner—S. Clement Swisher
Attorney, Agent, or Firm—Donald L. Johnson; John F. Sieberth; James M. Pelton

[57] ABSTRACT

A method and apparatus for introducing low pressure gas samples into the column of a chromatograph without substantial flow perturbations, particularly preferred is a gas sample manifold allowing pressurization of the low pressure sample into the sample loop of a gas sample valve.

9 Claims, 6 Drawing Figures

LOW PRESSURE GAS SAMPLE APPARATUS AND METHOD

BACKGROUND OF THE INVENTION

This invention relates to analysis of gases, particularly to analysis by gas-solid chromatography of gas samples of relatively low pressure. More particularly, the invention relates to introduction of low pressure gas samples into the gas-solid chromatograph column without causing substantial flow perturbations, thereby allowing calibration and analysis of lighter gas components, especially hydrogen, nitrogen, oxygen, methane and similar materials which are eluted in the chromatograph column within the first three minutes.

In the analysis of gas samples by gas-solid chromatography (hereinafter referred to simply as gas chromatography) using a thermal conductivity detector, the injection of the sample into the column is an important criterion that is often overlooked. This is because the thermal conductivity detector, a commonly used detector in gas chromatography, is both flow and concentration sensitive. Generally, a gas tight syringe or simple gas sample valve has been used for injecting gas samples into the chromatograph column. In many instances, the gas samples will be below or near atmospheric pressure. Therefore, the injection of a relatively low pressure sample into the chromatograph column operating at a set flow rate and pressure causes flow perturbations which are detected at the thermal conductivity detector. If such flow perturbations are substantial, that is, if the pressure differential between the gas sample and the operating pressure of the gas chromatograph column is more than about ± 10 psi, the flow upset can last for about five minutes at the detector. This effectively prevents accurate calibration and analysis of components of the gas sample eluted during this period.

According to the method and apparatus provided by my invention, low pressure gas samples may be introduced into the gas chromatograph column without substantial flow perturbation, which cause anomalous conditions at the detector, resulting in data which can be extremely useful for precise and accurate calibration and analysis of gas components eluted during about the first five minutes of operation.

SUMMARY OF THE INVENTION

I have found that a convenient and useful method for introduction of a low pressure gas sample into the chromatograph column without substantial flow perturbation comprises pressurizing said sample in a gas sample loop to about the operating pressure of the chromatograph column with a substantially inert carrier gas and introducing the pressurized gas sample into the chromatograph column. Preferably, the gas sample is pressurized with the same carrier gas as used in the chromatograph column. Also, preferably, the gas sample is pressurized to within about ± 5 psi of the pressure at which the chromatograph column operates.

The method of my invention is employed in an apparatus for introducing low pressure gas samples into a chromatograph column without substantial flow perturbation in which the apparatus comprises in combination a gas sample valve having a plurality of ports therein in which a first pair of said ports are connected to a carrier gas conduit for supplying carrier gas to the chromatograph column, a second pair of said ports are connected to a gas sample loop and a third pair of said ports are connected to a gas sample manifold means; a sample conduit connected at one end to a container for the low pressure gas sample and at the other end to the gas sample manifold means and in which there is a sample gas valve and a manometer between the sample container and the gas sample manifold means; an auxiliary carrier gas conduit connected at one end to said gas sample manifold means and at the other end to a supply of carrier gas and in which there is an auxiliary carrier gas valve and pressure regulator valve in the auxiliary carrier gas conduit; and a vacuum conduit connected at one end to the gas sample manifold means and at the other end to a vacuum source and which there is a vacuum valve, whereby the operation of the valves in a predetermined sequence allows evacuation and purging of the apparatus, loading a low pressure gas sample into the sample loop of the gas sample valve, pressurizing the sample into the gas sample loop at about the operating pressure of the chromatograph column and introducing the sample into the chromatograph column for analysis without causing substantial flow perturbation in the chromatograph column.

A particularly critical portion of the apparatus is the gas sample manifold means for use with a gas sample valve having a sample loop, said gas sample manifold means comprising a gas sample supply conduit in communication with gas sample valve connection means, a vacuum conduit and an auxiliary carrier gas supply conduit, whereby after introducing a sample into said gas sample manifold means, the gas sample is compressed by carrier gas through said gas sample valve connection means into the sample loop of said gas sample valve.

DESCRIPTION OF PREFERRED EMBODIMENTS

Figure 1A:
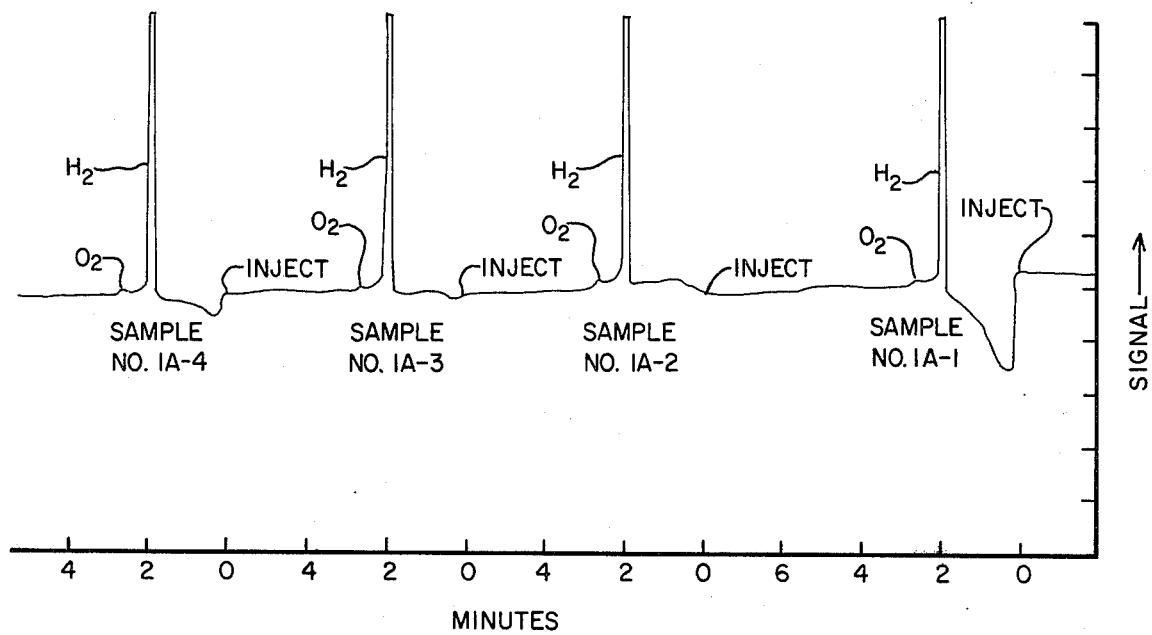
FIG. 1 is an illustration of the chromatograph recorder chart record showing the flow perturbations occurring on introduction or injection of a number of gas samples into the chromatograph column and partial analyses of several samples as more fully discussed hereafter.

The analysis of gas samples by gas chromatography using thermal conductivity detectors is widely recognized as a convenient and accurate analytical method. However, the column and detector are flow sensitive and concentration dependent. When the flow of carrier gas and/or a gas sample through the instrument is upset, it is difficult, if not impossible, to accurately determine calibration factors and analyze complex gas mixtures.

Thus, the introduction of low pressure gas samples presents difficulty because present methods, such as a gas tight syringe or a simple gas sample valve, produce flow perturbations which may last for 3 minutes or more and usually from 2 to 3 minutes. During this time, the more volatile components of the gas sample are eluted from the column. For example, hydrogen, oxygen, nitrogen, methane and carbon monoxide are eluted within about 3 minutes of introduction. Hydrogen is eluted first. Therefore, a method and apparatus which reduces or minimizes flow perturbations on introduction of low pressure gas samples before hydrogen is eluted will allow accurate and precise calibration and analysis of all components of the gas sample.

I have now discovered a method for introduction of a low pressure gas sample into a chromatograph column without substantial flow perturbation which comprises pressurizing said sample in a gas sample loop to about the operating pressure of the chromatograph column with a substantially inert carrier gas and introducing the pressurized gas sample into the chromatograph column. According to my invention the pressure and flow rate of the carrier gas through the column remain approximately the same when the sample is introduced or injected into the chromatograph column carrier gas conduit with only slight interruption because of the switching of a gas sample valve.

The effect of my invention is illustrated graphically on the resulting chromatograph recording chart as shown in FIG. 1. A gas sample bottle was connected to the apparatus of my invention and a number of samples were introduced serially into a dual column, programmed temperature gas chromatograph, Bendix Model 2300 with flow-thru thermal conductivity detector using WX filaments. Of course, equivalent chromatograph instruments can be used with my invention. The gas chromatograph column was 15' by 0.25 inch O.D. copper packed with 60/80 mesh Davison Grade 08 Silica Gel. The gas sample is introduced via a 6-port gas sample valve, such as a V-6-Hpa model available from Valco, Inc. or any similar 6-port gas sample valve. The gas chromatograph conditions used in making the chromatograph chart of FIG. 1 were as follows:

Table I

Gas Chromatograph Conditions

| | |
|---|---|
| Injection port (°C) | 50 |
| Detector (°C) | 225 |
| Oven program | |
| Initial temperature (°C) | 50 |
| Initial hold (min.) | 2 |
| Program rate (°C/min.) | 10 |
| Final temperature (°C) | 200 |
| Final hold (min.) | 30 |
| $N_2$ Carrier gas flow (ml/min.) | 60 |
| Detector bridge current (ma) | 70 |
| Attenuator setting | 1 |
| Sample loop (ml) | 1.0 |
| Column head pressure (psia) | 31.7 |

Figure 1B:
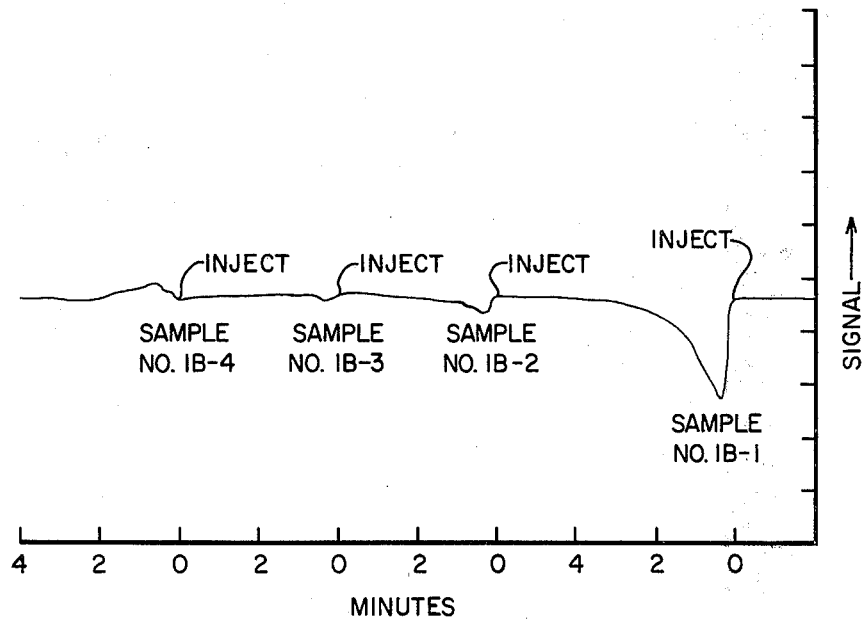

The chart speed was 1 inch per 2 minutes. FIG. 1 is divided into two parts. In FIG. 1A several analyses were made with a gas sample both with and without my invention showing the effect of flow perturbations on samples with components eluted in the first 3 minutes. In FIG. 1B runs were made without a real sample, just carrier gas, showing the flow perturbations caused both with and without my invention. Both FIGS. 1A and 1B have four separate runs which were introduced to the column under the following conditions:

Table II

| Fig. 1A Sample Loop Conditions | Sample Pressures | | | |
|---|---|---|---|---|
| | No. 1A-1 | No. 1A-2 | No. 1A-3 | No. 1A-4 |
| Initial sample pressure, psia | 17.7 | 17.4 | 17.3 | 17.0 |
| Final sample pressure, before injection, psia | 17.7 | 36.7 | 31.7 | 26.7 |
| Fig. 1B Sample Loop Conditions | No. 1B-1 | No. 1B-2 | No. 1B-3 | No. 1B-4 |
| Carrier Gas pressure, before injection, psia | 16.2 | 26.7 | 31.7 | 36.7 |

From the chromatograph chart represented in FIG. 1A, sample No. 1A-1 was considerably below the column head pressure of 31.7 psia and substantial flow perturbation occurred when the sample was injected, at time = 0 minutes. Conditions did not return to steady flow until about 3 minutes after injection during which $H_2$ and $O_2$ were eluted from the column. In contrast, a sample from the same bottle was pressurized according to my invention at 5 psi above column pressure, at the same column pressure, and at 5 psi below column pressure, sample Nos. 1A-2, 1A-3 and 1A-4, respectively, whereupon injection into the column caused only minor flow perturbations which were substantially returned to steady flow conditions by the time $H_2$ and $O_2$ were eluted.

The time required by the flow controller of the chromatograph to achieve steady flow after sample injection is more clearly illustrated when the sample loop is loaded with carrier gas only, as shown in FIG. 1B. In this portion of FIG. 1, only nitrogen carrier gas was introduced into the sample loop and injected into the column after attaining the pressures shown in Table II. With the column operating at 31.7 psia, sample No. 1B-1 at 16.2 psia was injected into the column causing flow perturbation lasting almost four minutes. In contrast, when the carrier gas was loaded into the sample loop at pressures 5 psi below, equal to, and 5 psi above column operating pressure, sample Nos. 1B-2, 1B-3 and 1B-4, respectively, only minor flow perturbations lasting 1.5, 0.75 and about 2 minutes, respectively, occurred. Thus, my invention allows the calibration and analysis for hydrogen and all other gas sample components using gas chromatograph analysis on low pressure gas samples which would otherwise not be possible.

Therefore, my invention includes the pre-pressurization of a low pressure gas sample prior to introducing the sample into the chromatograph column. Preferably, my invention is a method for introducing a low pressure gas sample into a chromatograph column without substantial flow perturbation comprising pressurizing said sample in a gas sample loop to about the operating pressure of the chromatograph column with a substantially inert carrier gas and introducing the pressurized gas sample into the chromatograph column.

By low pressure gas sample as used in this invention is meant a gas sample having an initial pressure in the sample loop less than the operating pressure of the gas chromatograph, and preferably from about 0.1 to about 23 psia or from about 5 to about 1200 mm of mercury absolute. Within this range, the gas sample is pressurized to within about ± 5 psi of the operating pressure of the chromatograph column, and preferably to within about ± 1 psi of the operating pressure of the chromatograph column. In general, the chromatograph column operates at a pressure within the range of from about 30 to about 45 psia and, thus, the sample is pressurized to 25 to about 50 psia, depending upon the operating pressure of the chromatograph column. Preferably, the sample is pressurized to 29 to about 46 psia, depending on the operating pressure of the column. It is most preferred, therefore, according to the method of the present invention, to have the initial pressure of the low pressure gas sample from about 0.2 to about 23 psia and pressurize the sample to within ± 5 psi of the operating pressure of the chromatograph column.

The literature recommends a number of carrier gases which can be used for chromatograph operation. Preferably, any substantially inert carrier gas which has a thermal conductivity substantially different from the gas samples to be analyzed will be useful. Examples of carrier gases which have been used are helium, nitrogen, argon, neon and the fluorohydrocarbons, for example, hexafluoroethane, tetrafluoroethane, dichlorodifluoroethane, chlorodifluoromethane and the like. Preferably, and particularly for the analysis of hydrogen, the substantially inert carrier gas is selected from nitrogen and argon, and most preferably, carrier gas is nitrogen. Although helium has been used as carrier gas in the analysis of hydrocarbon gas mixtures, helium has a thermal conductivity so close to hydrogen that it is unsuitable for analysis of gas samples having hydrogen as a major or trace component. Some references have suggested a mixture of helium and hydrogen, however the detector response is not satisfactory using such gas mixtures. Other methods have also indicated that the nitrogen should be used for a first pass in which hydrogen can be analyzed and a second carrier gas used for analysis of the other components. However, the method of the present invention is most preferably carried out when nitrogen is used as a carrier gas, especially for analysis of hydrogen-containing samples and the gas sample is pressurized to within ± 5 psi of chromatograph column operating pressure and where the chromatograph column operating pressure ranges from about 30 to about 45 psia.

Figure 2:
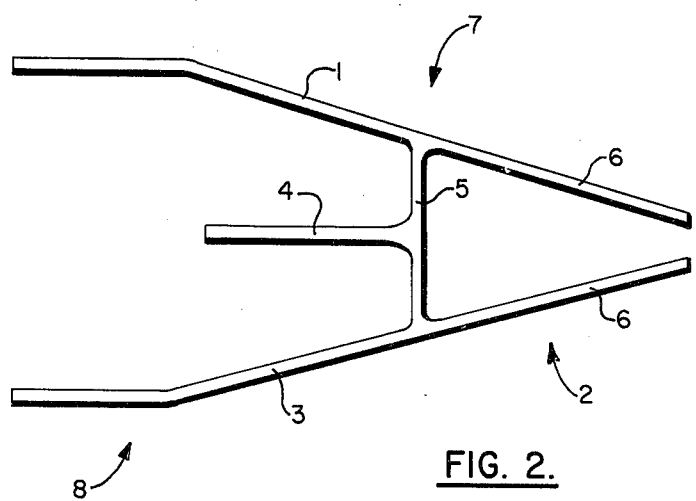
FIGS. 2–4 illustrate preferred gas sample manifold means.
Figure 3:
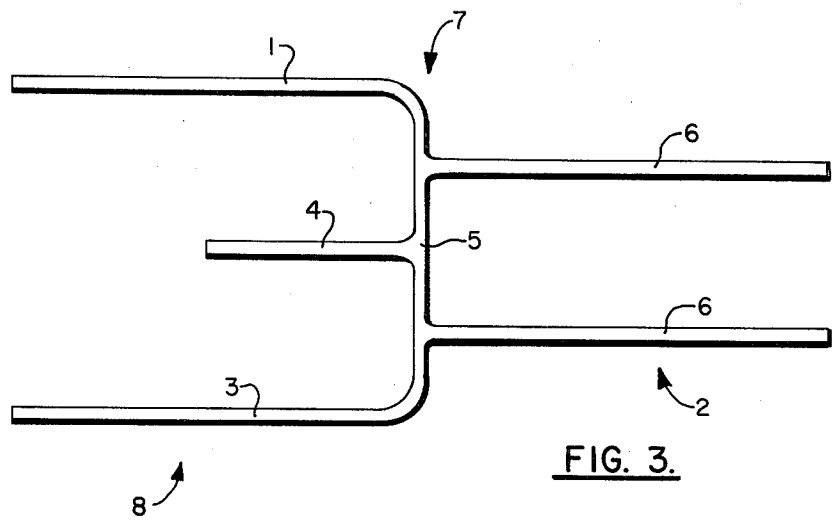
Figure 4:
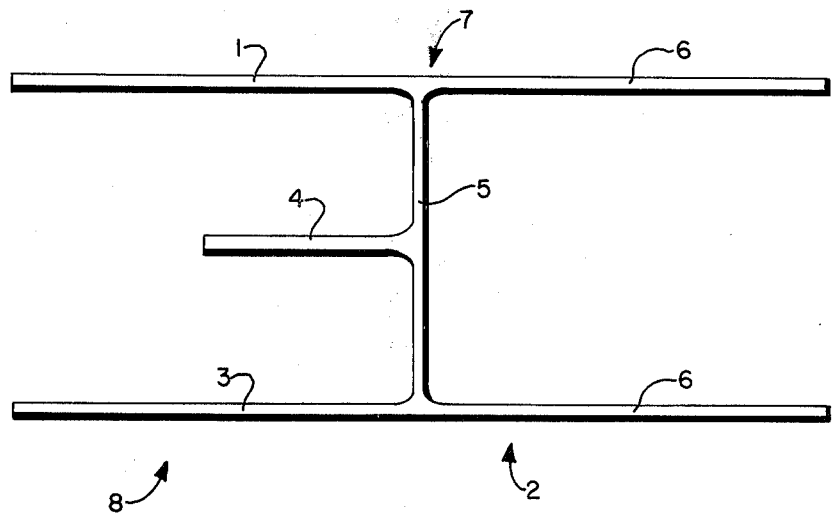

The method of the present invention requires the pressurization of the low pressure gas sample into the sample loop of the gas sample valve. Therefore, another aspect of this invention is the provision of a gas sample manifold means 7 by which pressurization of the low pressure gas sample can be accomplished. Referring to FIGS. 2-4, several variations of suitable gas sample manifold means 7 are illustrated. In FIG. 2, there is described a gas sample manifold means 7 for use with a gas sample valve having a sample loop, said gas sample manifold means 7 comprising a gas sample supply conduit 1 in communication via central conduit 5 with gas sample valve connection means 2, vacuum conduit 3, and auxiliary carrier gas supply conduit 4, whereby after introducing a gas sample into gas sample manifold means 7, the gas sample is compressed by carrier gas through said gas sample valve connection means 2, into the sample loop of said gas sample valve (not shown in FIG. 2).

In FIGS. 3 and 4, the gas sample manifold means are rounded or completely squared rather than angular as in FIG. 1. Such variations are well within the skill of the art and the reference numerals in FIGS. 3 and 4 have the same meaning as in FIG. 2.

In a preferred embodiment of the gas sample manifold means as shown in FIGS. 2, 3 and 4, the gas sample connection means 7 has a central conduit 5 having connected thereto said gas sample supply conduit 1 located at one end of said central conduit 5, a vacuum conduit 3 located at the other end of said central conduit 5, and an auxiliary carrier gas conduit 4 located at about the center of said central conduit 5 and having two gas sample valve connection conduits 2 connected to said central conduit 5 and located at each end of said central conduit 5 opposite said gas sample supply conduit 1 and said vacuum conduit 3, respectively. Stated in other terms, the gas sample manifold means 7 illustrated in FIGS. 2-4 has a gas sample valve connection means 2 which is a bifurcated gas sample valve connection means 2 which has substantially equal volumes and substantially equivalent gas flow characteristics in each leg 6. More preferably, each leg 6 of said bifurcated gas sample valve connection means 2 has a substantially equal volume, length and equivalent gas flow characteristics.

More specifically, the gas sample manifold means 7 of this invention comprises gas sample conduit 1, vacuum conduit 3, and auxiliary carrier gas conduit 4, forming trifurcated member 8 in communication with said bifurcated gas sample valve connection means 2. Thus, the gas sample manifold means 7 has bifurcated gas sample valve connection means 2 with substantially equal volume and gas flow characteristics in each leg 6 and said trifurcated member 8 formed from said gas sample conduit 1, said vacuum conduit 3 and said auxiliary carrier gas conduit 4, in communication with said bifurcated gas sample valve connection means 2, each member having substantially equal volumes and gas flow characteristics.

Figure 5:
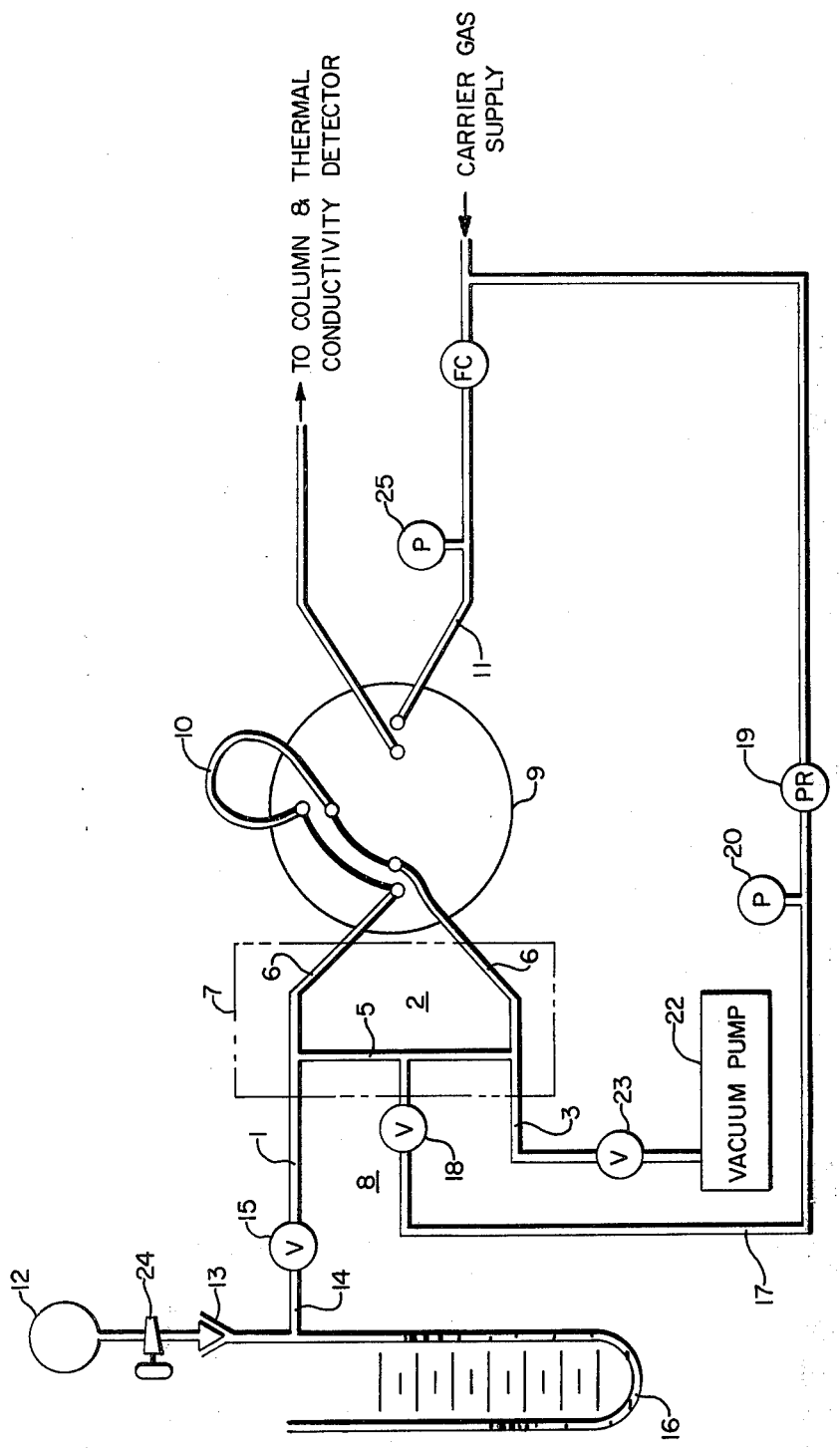
FIG. 5 is a schematic representation of the gas sample apparatus of the invention, illustrating the connection and the relationship of the various components in the system.

The gas sample manifold means of the invention is placed in the gas sample system as schematically shown in FIG. 5. As shown in FIG. 5, the gas sample valve 9 is connected to carrier gas conduit 11 by a first pair of ports, to sample loop 10 by a second pair of ports and to gas sample manifold means 7 by a third pair of ports. In the load position, the gas sample manifold means 7 is in communication with sample loop 10 and carrier gas can flow through carrier gas supply conduit 11 to the chromatograph colum. A gas sample bottle 12 containing a gas sample to be analyzed is connected to the gas sample system through standard tapered joint 13 by means of sample conduit 14 at one end and at the other end to the gas sample manifold means 7 and having sample gas valve 15 and a manometer 16 in sample conduit 14. An auxiliary carrier gas conduit 17 is connected at one end to carrier gas supply conduit 11 and at the other end to gas sample manifold means 7 and has auxiliary carrier gas valve 18 and pressure regulator 19 and pressure gage 20 in auxiliary carrier gas conduit 17. A vacuum conduit 21 is connected at one end to said gas sample manifold means 7 and at the other end to a vacuum source 22. Vacuum valve 23 is located in vacuum conduit 21. The operation of the valves in a predetermined sequence allows evacuation and purging of the gas sample system, loading a low pressure gas sample into sample loop 10, pressurizing the low pressure gas sample to about the operating pressure of the chromatograph column, and, on turning the gas sample valve 9, introducing the gas sample into the chromatograph column for analysis without causing substantial flow perturbation in the chromatograph column. Preferably, said gas sample valve 9 is a 6-port gas sample valve having a load position in which a second pair of ports connected to said gas sample loop 10 and a third pair of ports connected to gas sample manifold means 7 through gas sample valve connection means 2 are in communication and having an inject position in which said first pair of ports connected to said carrier gas conduit 11 and said second pair of ports connected to said gas sample loop 10 are in communication.

Operation of the gas sample system is relatively simple and straightforward. The gas sample bottle 12 fitted with stop cock 24 is inserted into the standard tapered joint 13 of the gas sample system. The auxiliary carrier gas supply is regulated by pressure regulator 19 until the auxiliary carrier gas pressure as read on pressure gage 20 is equal to the column head pressure as read on pressure gage 25. With gas sample valve 9 in the load position and stop cock 24 and auxiliary carrier gas valve 18, both closed, and sample valve 15 and vacuum valve 23, both opened, the sample loop 10, manometer 16, and associated conduits are evacuated. The pressure can range down to about 0.02 psi. Vacuum valve 23 is then closed and stop cock 24 of gas sample bottle 12 is opened allowing the gas sample to flow into the system and sample loop 10. The pressure is allowed to equalize and the pressure of the gas sample is then determined from reading the manometer 16 and barometric pressure. The stop cock 24 and sample valve 15 are then closed. The gas sample is now trapped in the gas sample manifold means 7 and the sample loop 10. Also note that the gas sample manifold means 7 is preferably symmetrical about the point where auxiliary carrier gas conduit 17 enters gas sample manifold means 7. When auxiliary carrier gas valve 18 is opened, the auxiliary carrier gas at column head pressure, usually 30 to 45 psia, compresses the gas sample into sample loop 10 and the dead space of valves 15 and 23. The volume exterior to the actual sample loop 10, that is, actually compressed into the sample loop 10, makes its effective volume larger than its nominal volume. This effective volume limits the gas sample pressure that can be compressed into sample loop 10. For a 1 ml loop it has been calculated that samples having initial sample pressures of up to 35 psia can be completely compressed into the sample loop, assuming an auxiliary carrier gas pressure of at least 45 psia. For safety, the gas sample system should be limited to gas samples not exceeding about 35 psia.

After pressurizing the gas sample into sample loop 10 to about the column head pressure, the sample is introduced into the chromatograph column by turning gas sample valve 9 to the inject position. Because the pressure in the sample loop 10 is substantially the same as the column head pressure no substantial flow perturbation is introduced into the column and calibration and analysis of the sample can proceed.

One skilled in the art can readily envision variations within the scope of the invention in the apparatus and method employed. Therefore, the invention is intended to be limited only by the lawful scope of the appended claims.

What is claimed is:

1. A method for introduction of a low pressure gas sample into a chromatograph column without substantial flow perturbation comprising isolating a gas sample within the sample loop of a gas sample valve, by blocking communication between said loop and the chromatograph column, pressurizing said sample in said loop of said valve to about the operating pressure of the chromatograph column with a substantially inert carrier gas and introducing the pressurized gas sample into the chromatograph column by establishing communication between said loop and said column.

2. The method of claim 1 wherein the initial pressure of said low pressure gas sample is from about 0.1 to about 23 psia.

3. The method of claim 1 wherein the chromatograph column operates at a pressure within the range of from about 30 to about 45 psia.

4. The method of claim 1 wherein said sample is pressurized to within about ± 5 psi of the operating pressure of said chromatograph column.

5. The method of claim 1 wherein said sample is pressurized to within about ± 1 psi of the operating pressure of said chromatograph column.

6. The method of claim 1 wherein the initial pressure of said low pressure gas sample is from about 0.1 to about 23 psia of said sample is pressurized to within about ± 5 psi of the operating pressure of the chromatograph column.

7. The method of claim 1 wherein said carrier gas is nitrogen, said gas sample is pressurized to within about ± 5 psi of said chromatograph column operating pressure and said chromatograph column operates at a pressure within the range of from about 30 to about 45 psia.

8. An apparatus for introducing low pressure gas samples into a chromatograph column without substantial flow perturbation, said apparatus comprising in combination
   a. a gas sample valve having a plurality of ports therein, in which a first pair of said ports are connected to a carrier gas conduit for supplying carrier gas to the chromatograph column, a gas sample loop connected to a second pair of said ports, and a gas sample manifold means connected to a third pair of said ports;
   b. a sample conduit connected at one end to a low pressure gas sample container and at the other end to said gas sample manifold means and having therebetween a sample gas valve and a manometer;
   c. An auxiliary carrier gas conduit connected at one end to said gas sample manifold means and at the other end to a supply of carrier gas and having therebetween auxiliary carrier gas valve and pressure regulator valve in said auxiliary carrier gas conduit; and
   d. a vacuum conduit connected at one end to said gas sample manifold means and at the other end to a vacuum source and having therebetween a vacuum valve; whereby the operation of said valves in a predetermined sequence allows evacuation and purging of the apparatus, loading a low pressure gas sample into said sample loop, pressurizing said sample to about the operating pressure of the chromatograph column and introducing said sample into the chromatograph column for analysis without causing substantial flow perturbation in the chromatograph column.

9. The apparatus of claim 8 wherein said gas sample valve is a six port gas sample valve having a load position in which said second pair of ports connected to said gas sample loop and said third pair of ports connected to said gas sample manifold means are in communication and an inject position in which said first pair of ports connected to said carrier gas conduit and said second pair of ports connected to said gas sample loop are in communication.

* * * * *